United States Patent [19]

Stevenson

[11] 3,733,934
[45] May 22, 1973

[54] BRAZING METHOD FOR CARBIDE TIPPED SAW BLADES

[76] Inventor: Norman A. Stevenson, 1632 East Merced Avenue, West Covina, Calif. 91791

[22] Filed: June 7, 1971

[21] Appl. No.: 150,626

[52] U.S. Cl. .........................76/112, 219/77, 76/25
[51] Int. Cl. .............................................B23d 65/00
[58] Field of Search .....................76/112; 143/133; 219/77; 29/484

[56] References Cited

UNITED STATES PATENTS

| | | | |
|---|---|---|---|
| 2,714,317 | 8/1955 | Drake | 76/112 |
| 2,826,941 | 3/1958 | Kolesh | 76/112 |
| 2,890,323 | 6/1959 | Lee | 219/130 |

*Primary Examiner*—Leonidas Vlachos
*Attorney*—Strauch, Nolan, Neale, Nies & Kurz

[57] ABSTRACT

A machine for brazing carbide tips onto the cutting teeth of circular saw blades comprising a vertical saw support jig attached to a cabinet enclosing carbon arc brazing apparatus therein. A first electrode is attached to the saw which is urged in a direction so that a carbide tip disposed against a saw tooth is forced into engagement with a second (carbon) electrode. A clearance gauge assures proper lateral placement of the tip against the saw tooth. The carbon arc brazing apparatus includes a variable rheostat calibrated to show differing saw thicknesses, at indices where the brazing area is brought to desired proper temperature related to the indicated saw thickness. A timer thermostat is used in the brazing circuit to prevent excess heat in the brazing area. The method for brazing a carbide tip to a circular saw tooth edge includes placing the saw in a jig, inserting a carbide tip to be brazed between a carbon electrode and the saw tooth, retaining the tip against the tooth by weight of a brazing electrode attached to the saw outside of the brazing area, brazing by moving a silver solder rod about the junction of the tip and saw tooth, and trimming the brazed, tipped saw tooth to a cutting edge.

3 Claims, 12 Drawing Figures

INVENTOR
NORMAN A. STEVENSON

INVENTOR
NORMAN A. STEVENSON

BY Strauch, Nolan, Neale, Nies & Kurz
ATTORNEYS

INVENTOR
NORMAN A. STEVENSON

BRAZING METHOD FOR CARBIDE TIPPED SAW BLADES

BACKGROUND OF THE INVENTION

1. FIELD OF THE INVENTION

The invention relates generally to treating saw blade edges and specifically to means and method for brazing hard carbide cutting bits or tips onto the teeth of circular saw blades.

2. DESCRIPTION OF THE PRIOR ART

The art of brazing and welding hard tips of dissimilar material to relatively softer blade stocks so as to form a relatively inexpensive cutting blade having a strong, durable and efficient cutting surface is presently well developed. Early development of the art is evidenced by U.S. Pat. No. 1,919,358, issued to Joseph P. Bem, wherein a central circular blade stock is mounted in a ring mold for forming an entire rim of relatively hard material which is then fashioned into a saw tooth edge. However, the blade formed by such a process is still too expensive to be commercially feasible.

U.S. Pat. Nos. 1,635,217, issued to Ferdinand H. Kirchman, U.S. Pat. Nos. 3,034,378 and 3,110,952, issued to William T. Anderson, and U.S. Pat. No. 3,295,396 issued to Gerhard G. Kolb all disclose methods of welding hard cutting tips to bases of softer dissimilar metals. In the Kirchman patent, a variable resistance is provided in the welding current circuit, to regulate the value thereof depending upon the materials to be welded together. However, a welding operation, as distinguished from a brazing operation, has inherent disadvantages. First, power requirements make such an operation expensive. Secondly, the welding operation requires some deformation of the two materials being joined. Thus, while the actual weld spot will be secure, areas in both materials adjacent the weld spot will be weakened and may fracture when the resultant product, a tipped saw, is put to use. Thirdly, the amount of current used must be extremely carefully regulated to assure a clean weld without over-heating the materials to be welded beyond their deformation limits.

The proposition that brazing is better than welding in the specific art of applying hardened tips to saw blade teeth has been recognized in U.S. Pat. No. 2,528,226 issued to Vernon H. Hildebrant and U.S. Pat. No. 2,714,317 issued to Claud E. Drake. But the disclosures of both patents are uninformative as to a specific means and methodology for successfully carrying out the process of attaching hard tips to saw teeth.

The present invention amplifies the prior art by teaching the use of a saw jig attached to a welding machine which is powered down to a current level which will provide sufficient heat for a brazing operation. The power supply includes a variable rheostat calibrated to varying saw thicknesses to provide appropriate heat without deforming the materials joined.

SUMMARY OF THE INVENTION

It is the principal object of this invention to provide apparatus for brazing hard cutting tip inserts onto the teeth of a circular saw blade including a mounting jig with weight means, which conveniently can be one of the electrodes, to press the individual tooth and hard metal tip against the other electrode for brazing.

It is another object of the invention to provide a brazing apparatus of the type described which includes a source of electrical power for brazing having variable rheostat means therein calibrated so that the indices show varying saw blade thicknesses for setting proper brazing currents for different thicknesses.

It is yet another object of the invention to provide a brazing apparatus as hereinbefore set forth wherein the electric power supply includes timing means for preventing over-heating of the brazing area arranged to interrupt current flow after a predetermined time interval.

It is a further object of the invention to provide a saw blade tip brazing apparatus having a vertically disposed jig for mounting the blade including a clearance guage for efficiently and expeditiously placing a tip to be joined to a blade tooth in proper lateral disposition with respect to the tooth prior to brazing.

A still further object of the invention is to provide a method of attaching carbide tips to the teeth of a circular saw blade comprising the steps of vertically mounting the saw in a jig with a tip urged against a tooth by one electrode and retaining the tip thereagainst by weight of the other electrode, brazing by means of a silver solder rod moved about the junction of the tip and tooth after said tooth and tip have been brought to brazing temperature from a source of electric current, and thereafter trimming the brazed tip to a cutting edge.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which.

DESCRIPTION OF THE PREFERRED EMBODIMENTS

Figure 2:
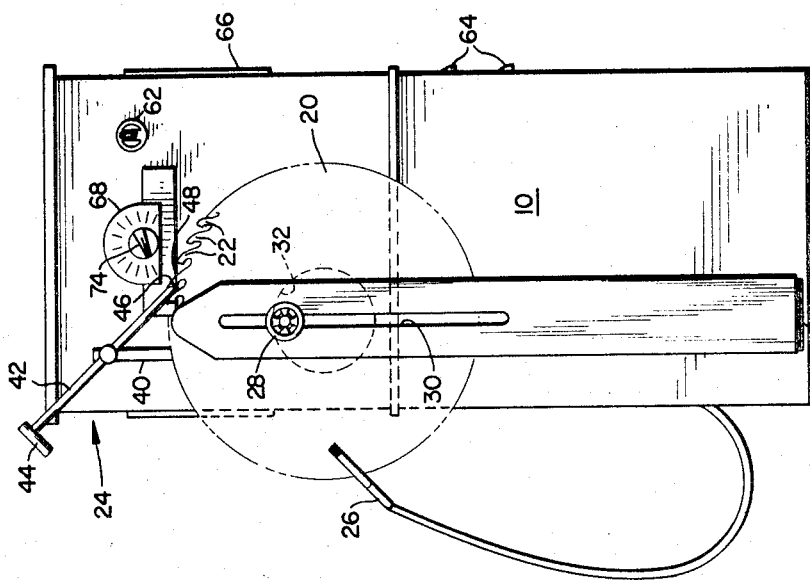
FIG. 2 is an elevational view of the apparatus as shown in FIG. 1, and drawn to an enlarged scale.
Figure 1:
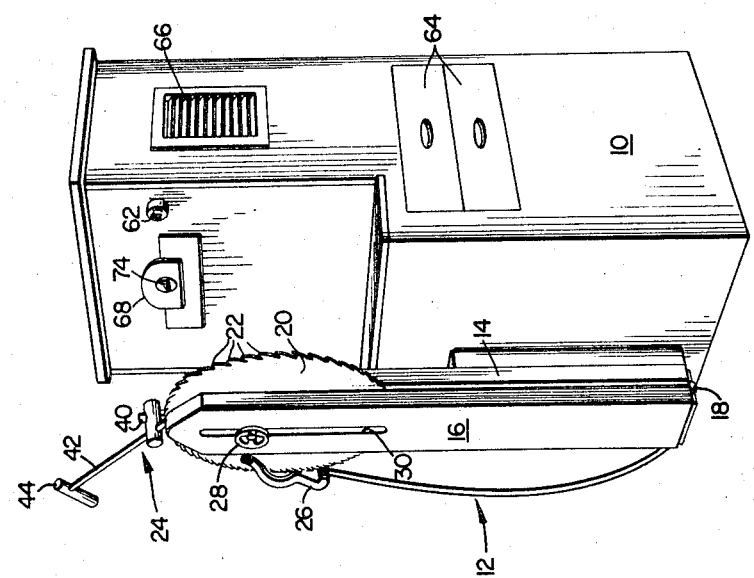
FIG. 1 is a perspective view of the brazing apparatus including a circular saw jig attached to cabinetry housing a suitable source of electric power.
Figure 11:
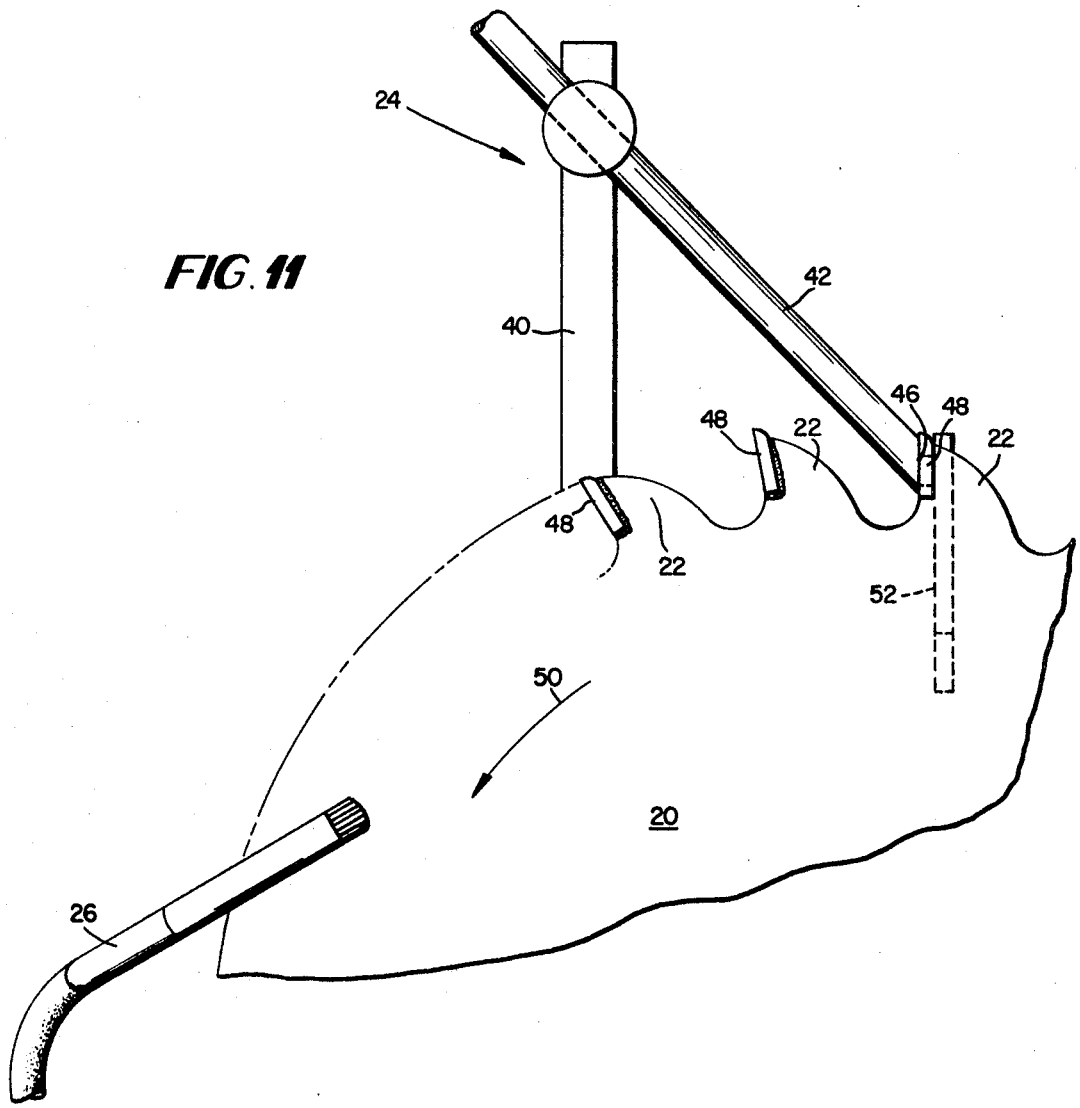
FIG. 11 is a partial elevational view showing positioning of the electrodes in the jig wherein the weight of one electrode presses a tip and adjacent tooth against the other electrode.

Cabinetry 10 housing a suitable source of electric power has a circular saw support jig 12 mounted on a side thereof comprising a vertical standard 14 and a jaw member 16, piano hinged to standard 14 at 18 for holding a circular saw blade 20 with teeth 22 to be tipped adjacent a primary electrode assembly 24. The return circuit clamp or secondary electrode 26 is in the form of a spring clamp and is secured as shown in FIGS. 2 and 11 outside of a vertical line drawn through the center axis of rotation of saw blade 20 so the weight of the clamped electrode will urge saw 20 rotationally against primary electrode assembly 24. A retaining screw 28 is inserted through an elongate slot 30 formed through jaw 16 and the center bore 32 of saw 20, and then through a slot 34, mating slot 30 in vertical standard 14; saw 20 is loosely clamped in jig 12 by screw 28 threaded to bolt 36 behind standard 14. The interior faces of vertical standard 14 and jaw 16 are lined with felt material spacers 38 to prevent teeth 22 of saw 20 from jamming within the cooperating halves of jig 12. Saw 20 is only loosely retained by screw 28 and bolt 36 thereby permitting the weight of spring clamp electrode 26 to rotationally urge the saw 20 counterclockwise, as illustrated in FIG. 2.

Primary electrode assembly 24 comprises an electrode support 40 with a carbon rod 42 slidably received therein. The assembly 24 may have a suitable handle 44 at one end for gripping by an operator. The lower tip contacting end 46 may be shaped to conform to the forward face of an individual carbide tip 48 to be brazed to a tooth 22 of a saw 20. FIG. 11 illustrates the holding function of electrode 26, as its weight urges saw 20 to the left, in the direction of arrow 50 to press a carbide tip 48 between electrode end 46 and a tooth 22.

Figure 6:
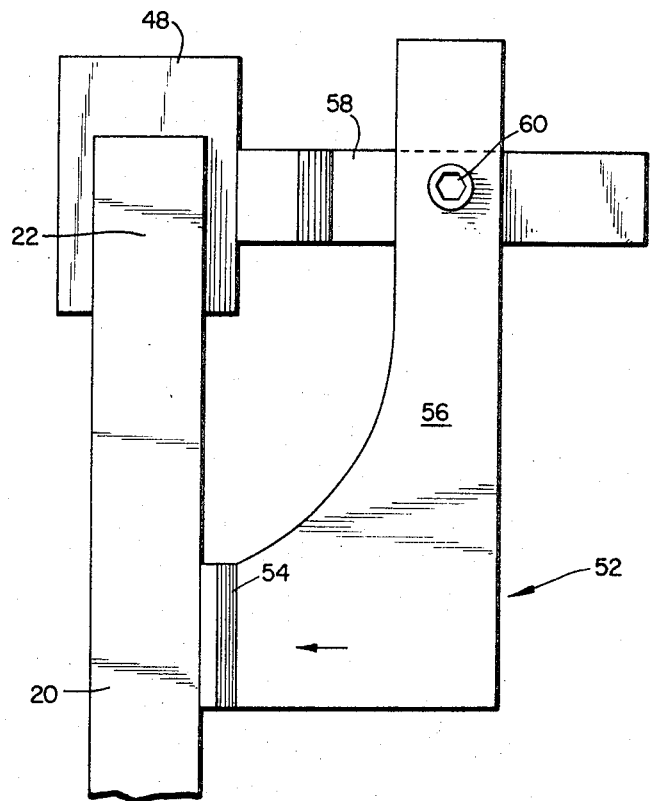
FIG. 6 is an end view of the clearance guage used to position a carbide tip on a saw tooth.

Proper lateral placement of carbide tip 48 is assured by means of a simple clearance guage 52 (FIG. 6) comprising a magnetic base 54, placed on saw 20, an arm 56, and a slidable abutment guage 58 retained in a predetermined position in arm 56 by a set screw 60. Abutment guage 58 is set in a desired position depending on the lateral dimension of saw 20 as well as the width of carbide tip 48 in order to center the tip on the tooth. Thereafter as each carbide tip is brazed, clearance guage 52 is merely moved along the periphery of saw 20 from tooth to tooth and each carbide tip 48 is pressed against its associated tooth just prior to brazing.

Figure 4:
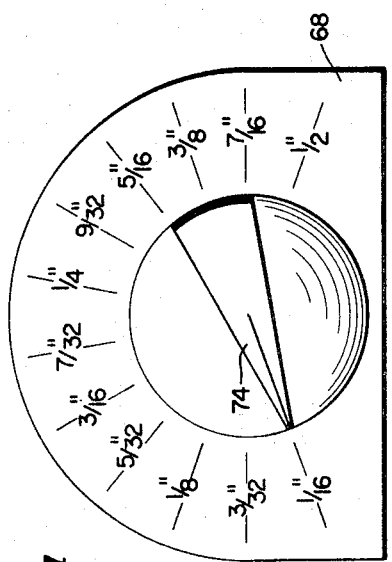
FIG. 4 is a plan view of the calibration dial used in the electrical power apparatus.
Figure 5:
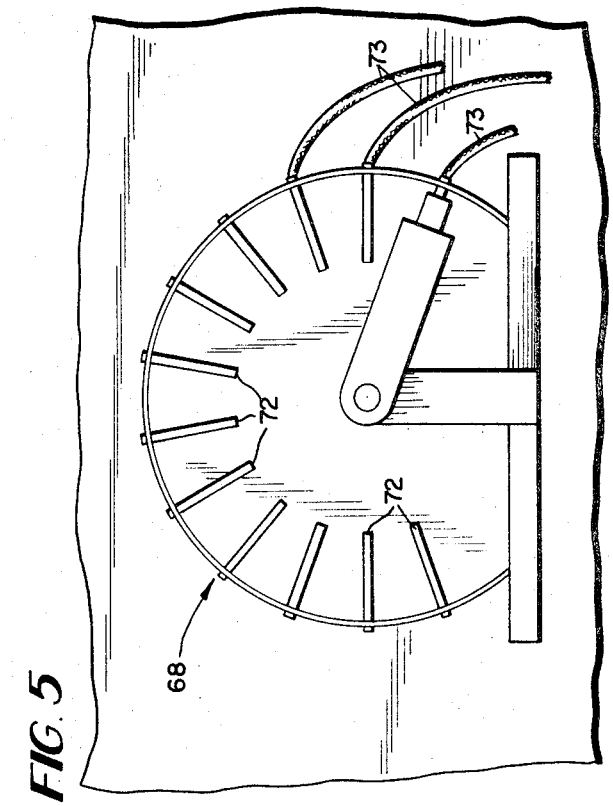
FIG. 5 is a plan view, interiorly of the cabinetry illustrating the reverse side of the calibration dial shown in FIG. 4.
Figure 3:
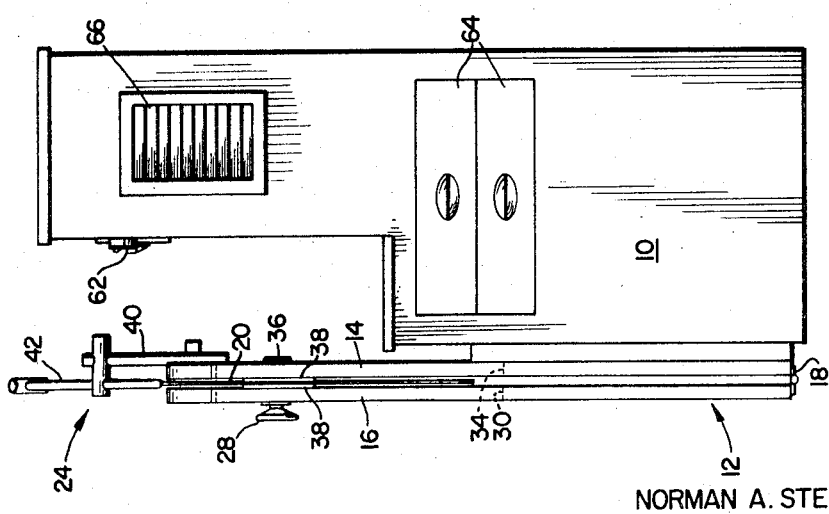
FIG. 3 is an end view of the apparatus as depicted in FIG. 2.
Figure 12:
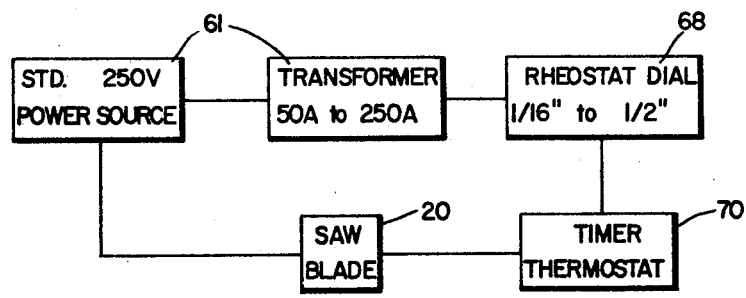
FIG. 12 is a simplified block diagram setting forth the major electrical components of the electric power supply.

Cabinetry 10 houses a suitable source of electric power, such as a standard, commercially available 250 amp. arc welder power supply 61 (FIG. 12). Mounted on cabinet 10 are an on-off switch 62, utility drawers 64,64, a louvre 66 which provides an exhaust for the arc welder cooling fan system (not shown) and a variable rheostat 68 (FIGS. 1,2,4,5 and 12) which is interposed in the wiring circuit of the standard arc welder power supply. Rheostat 68 is calibrated so its indices show varying saw blade thicknesses which may be from one-sixteenth to one-half inch as shown in FIG. 4. In conjunction therewith, a timer thermostat 70 (FIG. 12) is also inserted in the control circuit of the standard arc welder power supply, which, once brazing temperature is reached in the vicinity of a carbide tip 48 and tooth 22, will continue current therein for a short period of time (the adjustment range being 0 to 30 seconds in the preferred embodiment) whereafter current will be interrupted to avoid overheating. The individual contacts 72 and leads 73 of rheostat 68 are illustrated in FIG. 5.

Figure 7:
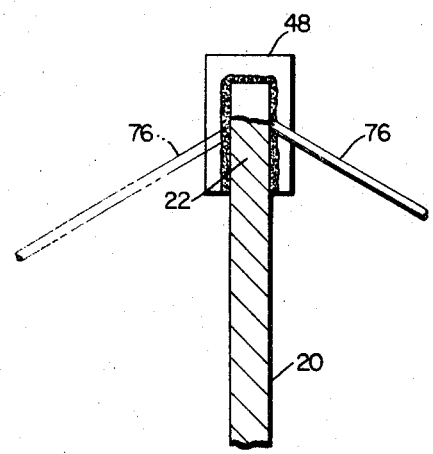
FIG. 7 is a partial top plan view illustrating the brazing step.
Figure 8:
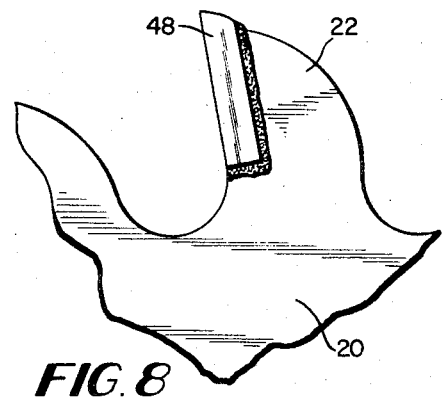
FIG. 8 is a partial elevational view showing a tip brazed onto a circular saw tooth.

The operation of the apparatus comprises individually brazing a tip 48 to each tooth 22 in station fashion, proceeding from tooth to tooth of saw 20 until the entire saw blade is complete. Each individual step of brazing is brief and relatively simple. First, a tip 48 is placed between electrode end 46 and a tooth 22, whereafter it is properly laterally disposed by clearance guage 52. Dial pointer 74 of rheostat 68 is turned to the proper thickness of saw blade 20. Current is turned on to bring the tip 48 and tooth 22 to brazing temperature, which takes but a few seconds unlike a welding operation where a much longer period of time is required to bring the area up to a temperature level suitable for welding. Thereafter, a silver solder rod 76 is moved about the junction of tip 48 and tooth 22 as shown in FIG. 7. During this step, timer thermostat 70 effectively prevents overheating. Current is turned off, whereafter saw 20 is hand indexed to the next tooth 22 to repeat the process. During indexing, screw 28 need not be adjusted since blade 20 is only loosely retained in jig 12, and secondary electrode 26 held with its spring clamp is readily shifted up to a new location after several tip brazing operations; its precise location on blade 20 is not critical. It need only be in a position to place a slight rotational biasing force on the saw to urge a tooth 22 and its tip 48 against primary electrode 24 in order to retain the carbide tip in place. The completed tooth 22 with a tip 48 brazed thereto is shown in FIG. 8.

Figure 9:
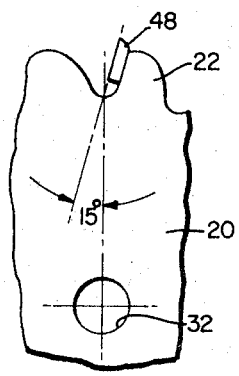
FIGS. 9 and 10 are partial diagrammatic views illustrating use of the invention with circular saw blades with teeth having hook angles varying from a negative 15° to a positive 45°.
Figure 10:
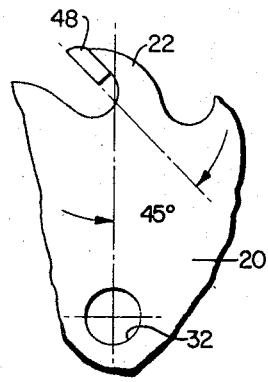

The simplicity of the apparatus makes it useful on circular saw blades of greatly varying thicknesses and radial dimensions, as well as tooth hook angles which, conventionally, vary from a negative 15° (FIG. 9) to a positive 45° (FIG. 10) depending on the intended purpose of the saw. Saw tooth 22 may be recessed to receive a tip 48 (FIG. 8) or may be plain edged (FIGS. 9 and 10). Once all of the teeth 22 and tips 48 have been brazed, the carbide tips 48 may be ground to a sharp cutting edge in conventional fashion (not illustrated).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of brazing a hard tip to a saw tooth of a circular saw blade comprising the steps of placing the circular saw in a jig, inserting a hard tip between a saw tooth and a brazing electrode, retaining the tip against the saw tooth by means secured to the blade to rotationally urge the tooth with said tip against the brazing electrode, bringing the tooth and tip at least at their junction to a temperature level for brazing by electrical power means, and brazing the tip to the tooth by moving a rod of silver solder about the junction of the tip and tooth.

2. The method of saw tooth brazing of claim 1, including the further step of grinding the hard tip to a sharp cutting edge upon completion of the brazing step.

3. The method of saw tooth brazing of claim 1, wherein the steps of retaining the tip against the saw tooth includes centrally positioning the hard tip on the saw tooth by preset guage means.

* * * * *

UNITED STATES PATENT OFFICE
CERTIFICATE OF CORRECTION

Patent No. 3,733,934          Dated May 22, 1973

Inventor(s) Norman A. Stevenson

It is certified that error appears in the above-identified patent and that said Letters Patent are hereby corrected as shown below:

Column 1, line 60, cancel "apparatus" and insert --a method--.

Column 1, line 61, after "including" insert --use of--.

Column 1, cancel lines 65-67.

Column 2, cancel lines 1-15.

Signed and sealed this 25th day of December 1973.

(SEAL)
Attest:

EDWARD M. FLETCHER, JR.          RENE D. TEGTMEYER
Attesting Officer                 Acting Commissioner of Patents